(12) United States Patent
Wang et al.

(10) Patent No.: US 7,614,387 B2
(45) Date of Patent: Nov. 10, 2009

(54) EXTERNAL FUEL VAPOR EMISSION ADJUSTING DEVICE FOR FUEL TANK

(75) Inventors: Aaron Wang, Taoyuan (TW); Chun-Chao Huang, Taoyuan (TW)

(73) Assignee: Sentec E & E Co., Ltd., Taoyuna (TW)

( * ) Notice: Subject to any disclaimer, the term of this patent is extended or adjusted under 35 U.S.C. 154(b) by 384 days.

(21) Appl. No.: 11/772,245

(22) Filed: Jul. 2, 2007

(65) Prior Publication Data

US 2008/0283127 A1 Nov. 20, 2008

(30) Foreign Application Priority Data

May 17, 2007 (TW) .............................. 96117649 A (51) Int. Cl.
*F02M 33/02* (2006.01)
(52) U.S. Cl. ...................... 123/519; 123/520
(58) Field of Classification Search ................. 123/516, 123/518, 519, 520
See application file for complete search history.

(56) References Cited

U.S. PATENT DOCUMENTS

| 3,575,152 A | * | 4/1971 | Wentworth | 123/520 |
| 4,790,283 A | * | 12/1988 | Uranishi et al. | 123/519 |
| 5,056,494 A | * | 10/1991 | Kayanuma | 123/519 |
| 5,337,721 A | * | 8/1994 | Kasuya et al. | 123/519 |
| 5,477,836 A | * | 12/1995 | Hyodo et al. | 123/519 |
| 5,632,251 A | * | 5/1997 | Ishikawa | 123/519 |
| 5,687,697 A | * | 11/1997 | Ishikawa | 123/520 |
| 5,697,348 A | * | 12/1997 | Schwager | 123/520 |
| 5,806,500 A | * | 9/1998 | Fargo et al. | 123/520 |
| 7,047,952 B1 | * | 5/2006 | Yamauchi et al. | 123/519 |

* cited by examiner

*Primary Examiner*—Thomas N Moulis
(74) *Attorney, Agent, or Firm*—Chun-Ming Shih (57) ABSTRACT

A fuel vapor adjusting device includes an expansion chamber at a top portion of a fuel tank; an oil spill trip valve being connected to the expansion chamber, which can turn off when there's spilling oil or the fuel tank is fell down; and at least two canisters. Each canister includes a fuel vapor entrance port, a fuel vapor outlet port, and a fuel vapor recycling vent. The fuel vapor entrance port and the fuel vapor outlet port form a fuel vapor filtering passage, and the fuel vapor entrance port and the fuel vapor recycling vent form a fuel vapor recycling passage. The oil spill trip valve, the at least two fuel vapor filtering passages connect in series, and the oil spill trip valve, the at least two fuel vapor recycling passages connect in parallel.

4 Claims, 9 Drawing Sheets

EXTERNAL FUEL VAPOR EMISSION ADJUSTING DEVICE FOR FUEL TANK

BACKGROUND

The present invention relates to a fuel tank, particular relates to an external fuel vapor emission adjusting device for adjusting the pressure of fuel vapor therein and stopping overflowing of fuel.

In the conventional technology, for avoiding the leaking of the fuel vapor in the fuel tank, a canister is applied at the passage connected with the atmosphere environment. The canister has a plurality of trap valves (filter) and activated carbons for trapping the hazardous substance in the fuel vapor and avoiding discharging it into the atmosphere and avoiding contaminating the atmosphere.

In addition, except that the fuel in the fuel tank is applied to the engine, the fuel vapor is also stored and purged to an engine air inlet connected to a recycling vent of the canister upon an intermittent negative pressure produced when the engine operates.

However, only one canister is generally provided, the filter capacity of the canister is limited by the quantity of the trap valve and activated carbon. For resolving this problem, a typical method for increasing the filter capacity is increasing the quantity of the trap valve and activated carbon, and adding the size and capacity of the canister.

In addition, the fuel vapor recycling is also limited by the quantity of the trap valve and activated carbon, i.e. the quantity of the trap valve and activated carbon needs to be determined according to the engine air displacement. Thus, the added trap valve and activated carbon brings resistance to the intermittent negative pressure of the engine, which obstructs the recycling of the fuel vapor.

BRIEF SUMMARY

An exemplary fuel vapor adjusting device includes an expansion chamber at a top portion of a fuel tank; an oil spill trip valve being connected to the expansion chamber, which can turn off when there's spilling oil or the fuel tank falls down; and at least two canisters. Each canister includes a fuel vapor entrance port, a fuel vapor outlet port, and a fuel vapor recycling vent. The fuel vapor entrance port and the fuel vapor outlet port form a fuel vapor filtering passage, and the fuel vapor entrance port and the fuel vapor recycling vent form a fuel vapor recycling passage. The oil spill trip valve, the at least two fuel vapor filtering passages connect in series, and the oil spill trip valve, the at least two fuel vapor recycling passages connect in parallel.

The fuel vapor emission adjusting device utilizes the oil spill trip valve, the at least two fuel vapor filtering passages connecting in series to improve the filter capacity for filtering the hazardous substance, and further utilizes the oil spill trip valve, the at least two fuel vapor recycling passages connecting in parallel to recycle the fuel vapor, which can lessen the resistance to the intermittent negative pressure of an engine brought by the trap valves and activated carbon in canisters. Therefore, the fuel vapor recycling process is smoothened.

In an alternative fuel vapor adjusting device, a control valve is provided between the oil spill trip valve and the at least two fuel vapor filtering passages.

In another alternative fuel vapor adjusting device, a control valve is provided between the at least two fuel vapor recycling passage and an engine inlet port, for controlling the time of turning on or turning off the engine inlet port.

In a further another alternative fuel vapor adjusting device, a one way valve between the at least two fuel vapor filtering passages, which connects with external atmosphere environment.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
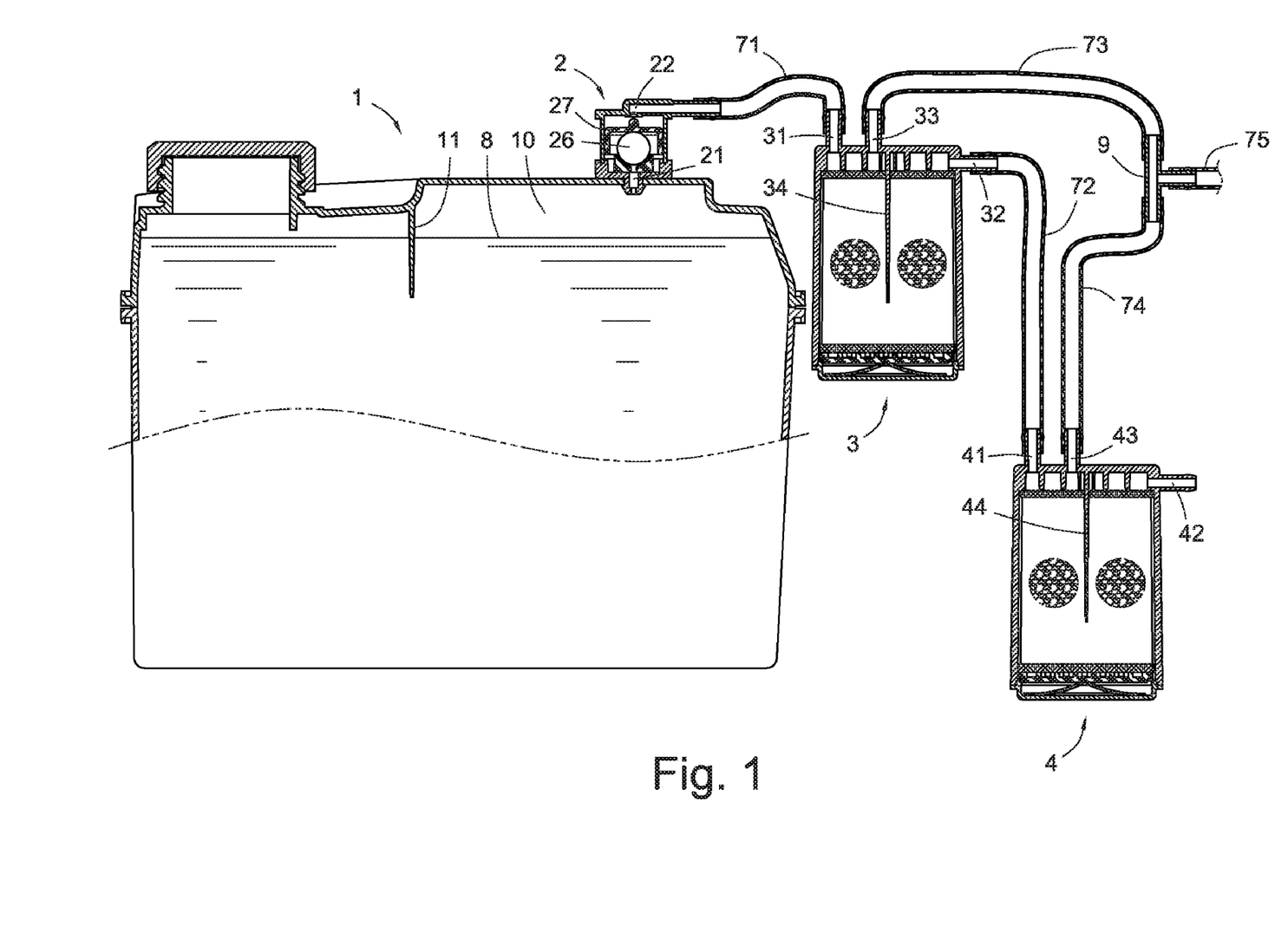
FIG. 1 is a schematic, cross-sectional view of a fuel vapor emission adjusting device according to a first embodiment of the present invention.
Figure 2:
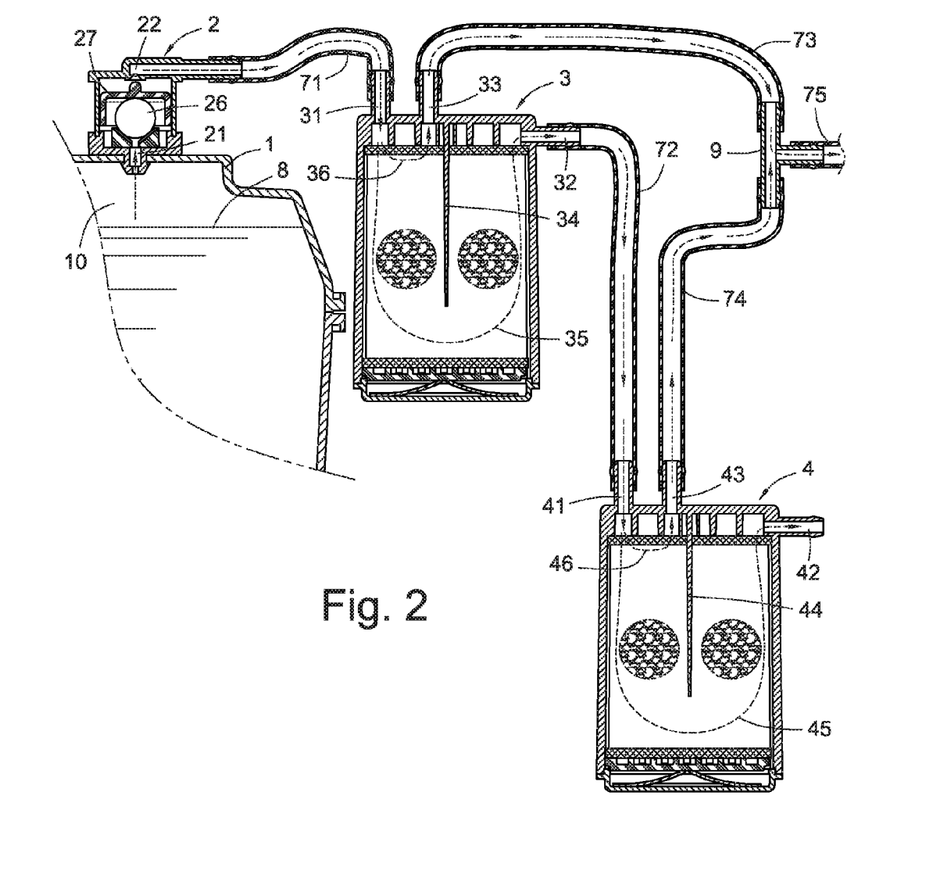
FIG. 2 is a partially enlarged view of the fuel vapor emission adjusting device of FIG. 1.
Figure 3:
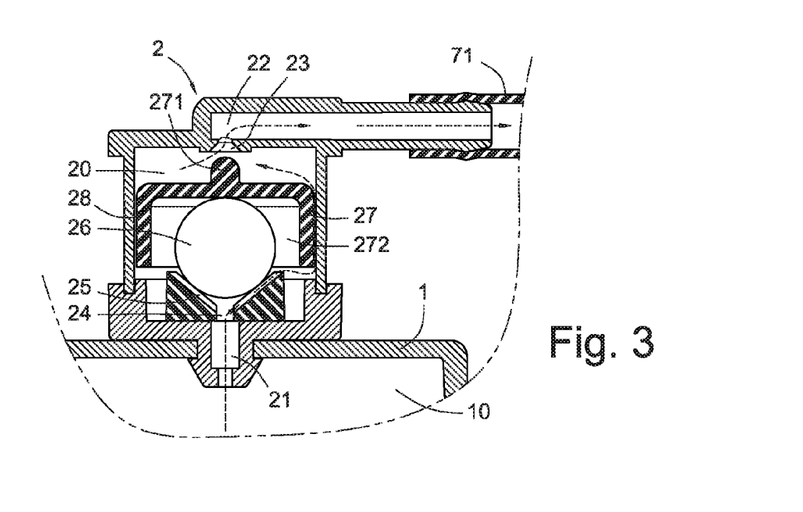
FIG. 3 is an enlarged view of a part of the fuel vapor emission adjusting device of FIG. 2.

Referring to FIGS. 1-3, a fuel vapor emission adjusting device according to a first embodiment of the present invention is shown. The fuel vapor emission adjusting device has a clapboard 11 formed in a top portion of a fuel tank 1, which is used to space a top surface of the fuel received therein to form an expansion chamber 10 for concentrating fuel vapor therein. The fuel vapor emission adjusting device further has an oil spill trip valve 2 at a top portion of the fuel tank 1, connecting with the expansion chamber 10, and two canisters 3, 4 disposed at an outside of the fuel tank 1.

The oil spill trip valve 2 includes a valve chamber 20, a leading-in vent 21, an educing vent 22 (as shown in FIG. 3). The leading-in vent 21 and the educing vent 22 respectively connects with the valve chamber 20, and another end of the leading-in vent 21 is connected to the expansion chamber 10. The educing vent 22 protrudes toward the valve chamber 20 to form a pyramidal opening 23 at their joint point. The valve chamber 20 has a pyramidal groove 24, its bottom portion connecting with a top portion of the leading-in vent 21. The pyramidal groove 24 further has a plurality of slots 25 formed at the groove wall. A roller 26 is received in the pyramidal groove 24, which can freely roll in the pyramidal groove 24. A ring-shaped float 27 is disposed between the roller 26 and the educing vent 22, which has a protrusion 271 corresponding to the pyramidal opening 23, and a concave groove 272 corresponding to the roller 26. The inner wall of the valve chamber 20 and the external peripheral surface of the float 27 define a ring-shaped vapor passage 28 with the leading-in vent 21 and the educing vent 22.

The first and the second canisters 3, 4 respectively have a plurality of trap valves and activated carbons (as shown in FIG. 2). Each of the two canisters 3 (4) further has a fuel vapor entrance port 31 (41), a fuel vapor outlet port 32 (42), and a fuel vapor recycling vent 33 (43). A partition sheet 34 (44) is provided in each of the two canisters 3 (4). The partition sheet 34 of the first canister 3 is disposed between the fuel vapor entrance port 31 and the fuel vapor outlet port 32 for forming a first fuel vapor filtering passage 35. The fuel vapor entrance port 31 and the fuel vapor recycling vent 33 form a first recycling passage 36. The partition sheet 44 of the second canister 4 is disposed between the fuel vapor entrance port 41 and the fuel vapor outlet port 42 for forming a second fuel vapor filtering passage 45. The fuel vapor entrance port 41 and the fuel vapor recycling vent 43 form a second recycling passage 46.

According the above-disclosed fuel tank 1, the oil spill trip valve 2, the first canister 3, and the second canister 4, a first conduit 71 (as shown in FIG. 2) is provided between the educing vent 22 of the oil spill trip valve 2 and the fuel vapor entrance port 31. A second conduit 72 is provided between the fuel vapor outlet port 32 of the first canister 3 and the fuel vapor entrance port 41 of the second canister 4. The fuel vapor outlet port 42 of the second canister 4 connects with the atmosphere environment. Thus, the oil spill trip valve 2, the first fuel vapor filtering passage 35, the second fuel vapor filtering passage 45 connect in series and communicate with the atmosphere environment through the second fuel vapor filtering passage 45. The fuel vapor recycling vent 33 of the first canister 3 connects with a third conduit 73, the fuel vapor recycling vent 43 of the second canister 4 connects with a fourth conduit 74, and an engine leading-in vent (not labeled) of an engine connects with a fifth conduit 75. The third, the fourth, and the fifth conduits 73, 74, 75 communicate with each other through a tee pipe 9, which makes the first recycling passage 36 and the second recycling passage 46 respectively parallelly connect with the engine leading-in vent.

Through above described elements, the fuel vapor stored in the expansion chamber 10 of the fuel tank 1 produces an expansion pressure, which drives the fuel vapor into the oil spill trip valve 2 through the leading-in vent 21 (as shown in FIG. 3), and then into the first conduit 71 (as shown in FIG. 2) along the plurality of slots 25, the ring-shaped vapor passage 28, the pyramidal opening 23, and educing vent 22, and then into the first canister 3 along the entrance port 31, the first fuel vapor filtering passage 35 and the outlet port 32 for purifying the fuel vapor. After that, the purified fuel vapor from the outlet port 32 of the first canister 3 flows into the second canister 4 along the second conduit 72, the entrance port 41 of the second canister 4, the second fuel vapor filtering passage 45 and is guided to the outlet port 42 for further purifying. Finally, the purified fuel vapor is exhausted into the atmosphere for adjusting and lessening the expansion pressure at the fuel tank 1. In addition, a part of the fuel vapor flowing into the entrance port 31 of the first canister 3 is guided into the recycling vent 33 of the first canister 3 through the first fuel vapor recycling passage 36 and receives the intermittent negative pressure suction through the third conduit 73, which are recycled back into the engine leading-in vent. And, a part of the fuel vapor flowing into the entrance port 41 of the second canister 4 is guided into the recycling vent 43 of the second canister 4 through the second fuel vapor recycling passage 46 and receives the intermittent negative pressure suction through the fourth conduit 74, which are also recycled back into the engine leading-in vent. Thus, the fuel vapor emission adjusting device utilizes the first and the second canisters 3, 4 to purify the fuel vapor in the fuel tank 1 according to the air displacement of the engine. In addition, the fuel vapor emission adjusting device utilizes the first and the second fuel vapor filtering passages 35, 45 of the first and the second canisters 3, 4 connecting in series to improve the filter capacity for filtering the hazardous substance, and further utilizes the first and the second fuel vapor recycling passages 36, 46 of the first and the second canisters 3, 4 connecting in parallel to recycle the fuel vapor, which can lessen the resistance to the intermittent negative pressure of the engine brought by the trap valve and activated carbon therein. Therefore, the fuel vapor recycling process is smoothened.

Figure 4:
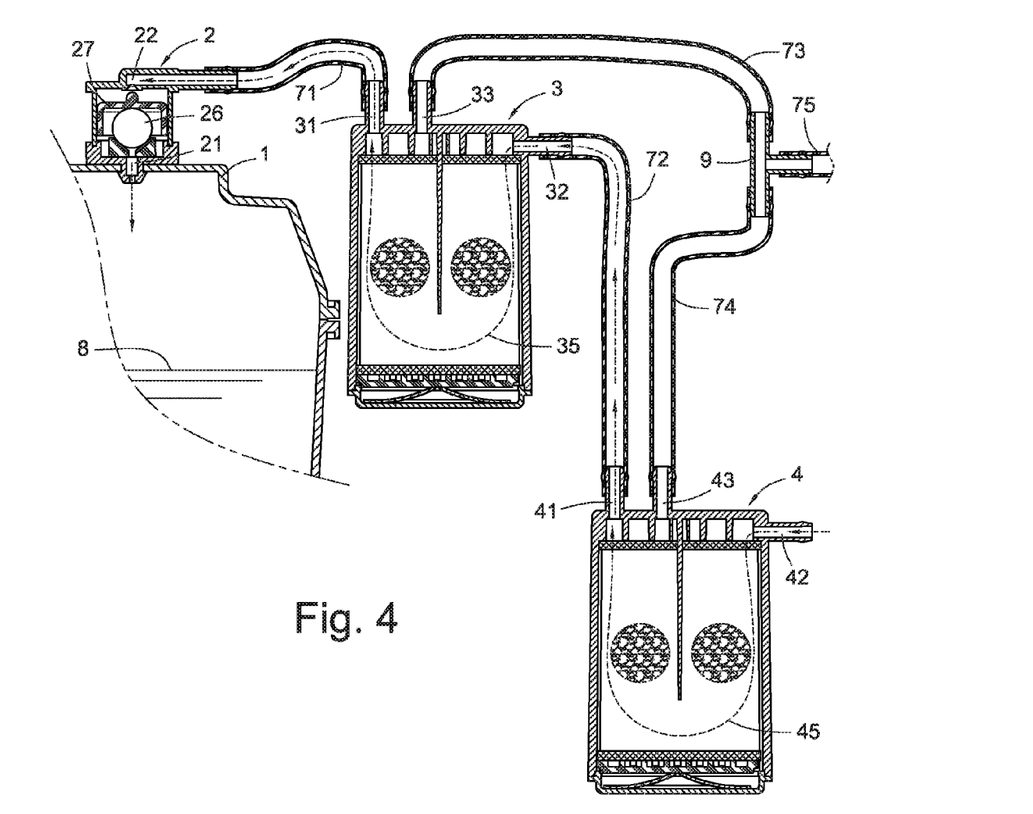
FIG. 4 is a schematic, cross-sectional view showing an operation state of the fuel vapor emission adjusting device of FIG. 2.
Figure 5:
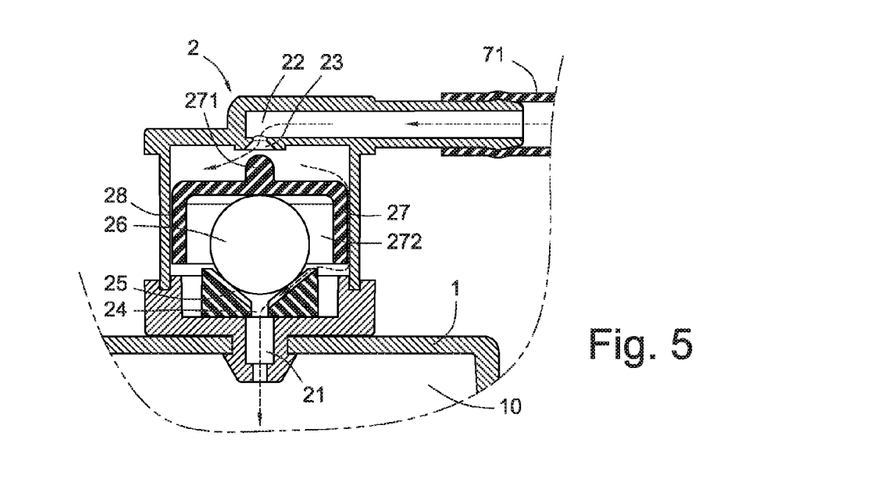
FIG. 5 is a schematic, cross-sectional view showing an operation state of the fuel vapor emission adjusting device of FIG. 3.

When the fuel 8 is lessen and a vacuum pressure is produced in the fuel tank 1 (as shown in FIG. 4), the high atmosphere pressure drives the air to flow into the second fuel vapor filtering passage 45; and into the first fuel vapor filtering passage 35 along the entrance port 41 of the second canister 4, the second conduit 72, and the outlet port 32 of the first canister 3; and then into the oil spill trip valve 2 along the entrance port 31 of the first canister 3, the first conduit 71, and the educing vent 22 (as shown in FIG. 5); and finally into the fuel tank 1 through the pyramidal opening 23, the ring-shaped vapor passage 28, the plurality of slots 25, and the leading-in vent 21. Thus, the vacuum pressure in the fuel tank 1 can be adjusted and be lowered.

Figure 6:
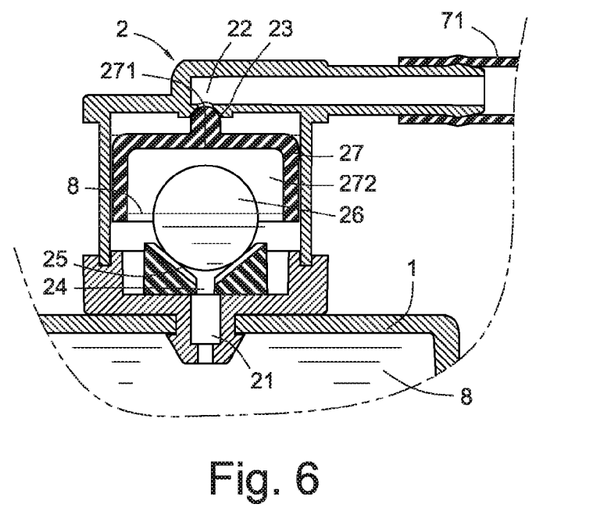
FIG. 6 is a schematic, cross-sectional view showing another operation state of the fuel vapor emission adjusting device of FIG. 3.
Figure 7:
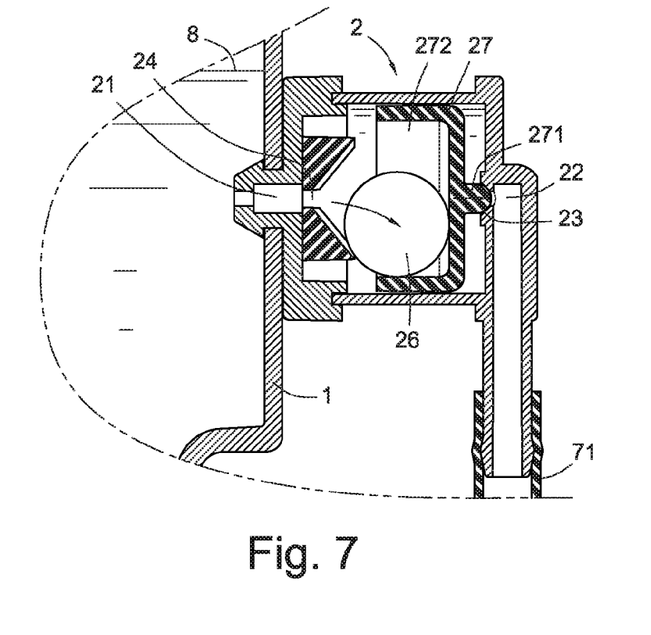
FIG. 7 is a schematic, cross-sectional view showing a further another operation state of the fuel vapor emission adjusting device of FIG. 3.

When the fuel 8 in the fuel tank 1 bursts at the seams (as shown in FIG. 6), the fuel 8 can flow into the oil spill trip valve 2 through the leading-in vent 21. The concave groove 272 still stores some fuel vapor. The ring-shaped float 27 moves upward under a buoyancy of the fuel 28, and pulls the protrusion 271 to be embedded in the pyramidal opening 23. Thus, the protrusion 271 closes the educing port 22, which configuration can effectively prevent the fuel 28 from flowing to the atmosphere environment through the first and the second canisters 3, 4. When a vehicle having the fuel vapor emission adjusting device falls down (as shown in FIG. 7), the fuel tank 1, the oil spill trip valve 2, the first canister 3, and the second canister 4 is positioned at a vertical direction. The roller 26 in the pyramidal groove 24 of the oil spill trip valve 2 rolls forward and pulls the concave groove 272 of the float 27 and drives the protrusion 271 of the float 27 to be embedded in the pyramidal opening 23. Thus, the protrusion 271 closes the educing port 22, which configuration can effectively prevent the fuel 28 from flowing to the atmosphere environment through the first and the second canisters 3, 4. Therefore, the fuel tank 1 can effectively prevent the fuel 28 from overflowing, which improves the usage life of the fuel tank 1.

Figure 8:
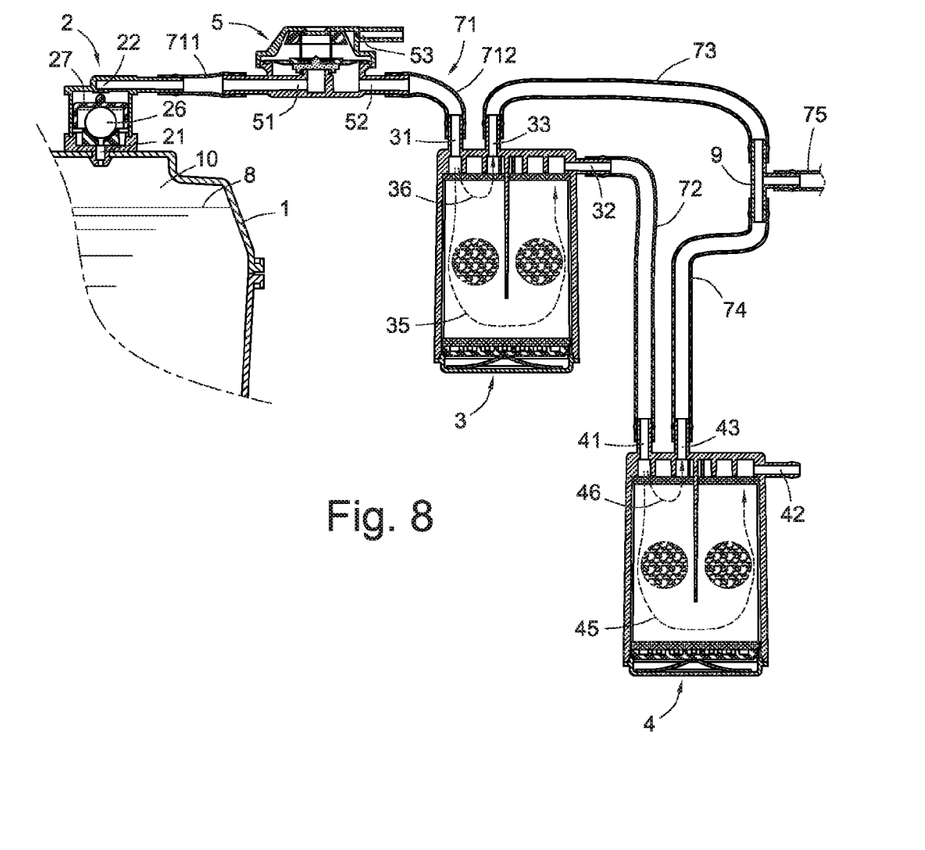
FIG. 8 is a schematic, cross-sectional view of a fuel vapor emission adjusting device according to a second embodiment of the present invention.
Figure 9:
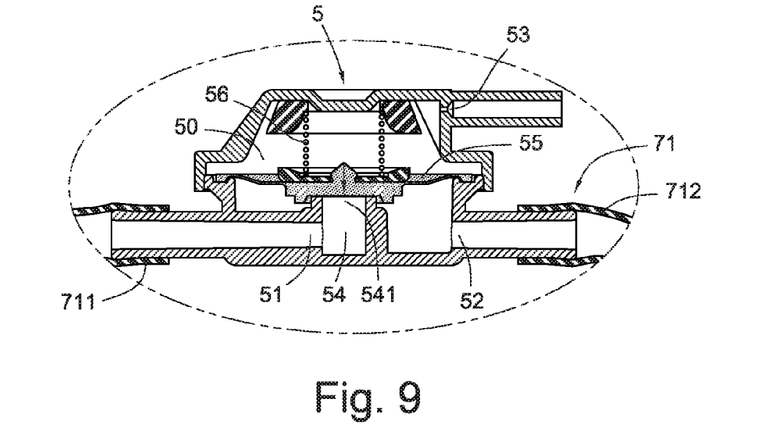
FIG. 9 is a partially enlarged view of the fuel vapor emission adjusting device of FIG. 8.
Figure 10:
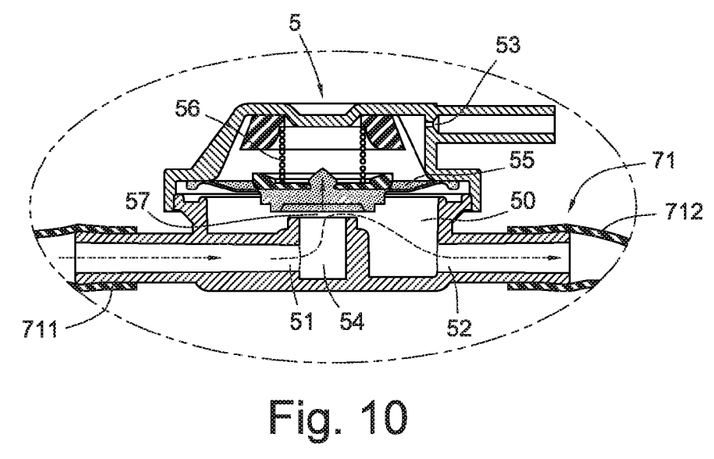
FIG. 10 is a schematic, cross-sectional view showing an operation state of the fuel vapor emission adjusting device of FIG. 9.

As shown in FIG. 8, a fuel vapor emission adjusting device according to a second embodiment of the present invention is shown. The fuel vapor emission adjusting device has a similar structure to that of the first embodiment except that a control valve 5 is provided at the first conduit 71 between the oil spill trip valve 2 and the first fuel vapor filtering passage 35. The control valve 5 has a valve chamber 50, a channel 54 disposed at a bottom portion of the valve chamber 50, a third vapor vent 53 connected to a top portion of the valve chamber 50, communicating with the atmosphere environment, a second vapor vent 52 connected to the bottom portion of the valve chamber 50, a first vapor vent 51 connected to a side of the channel 54, a valve plug 55 slidablely disposed between a top portion of the valve chamber 50 and a notch 541 formed at top portion of the channel 54 for separating the third vapor vent 53 from the first and the second vapor vents 51, 52, a spring 56 disposed between the top portion of the valve chamber 50 and the valve plug 55, which drives the valve plug 55 to cover the notch 541 of the channel 54 for forming a valve port 57 therebetween (as shown in FIG. 10). When the valve port 57 turns on, the first and the second vapor vents 51, 52 communicate with each other; and when the valve port 57 turns off, the communication between the first and the second vapor vents 51, 52 is cut off. In addition, the first vapor vent 51 connects with the educing vent 22 of the oil spill trip valve 2 through a fore port 711 of the first conduit 71, and the second vapor 52 connects with the entrance port 31 of the first canister 3 through a rear port 712 of the second conduit 72.

As above described configuration of the fuel vapor emission adjusting device, when the expansion pressure of the fuel vapor in the expansion chamber 10 is larger than a sum of a spring pressure of the spring 56 and the atmosphere pressure guided by the third vapor vent 53 (as shown in FIG. 8), the expansion pressure drives the fuel vapor to flow into the fore port 711 (as shown in FIG. 10) through the educing vent 22 of the oil spill trip valve 2, and into the channel 54 through the first vapor vent 51, which drives the valve plug 55 to turn on the valve port 57, and then into the rear port 712 through the valve port 57, the valve chamber 50, and the second vapor vent 52, and finally to be exhausted into the external atmosphere along the first fuel vapor filtering passage 35, the second conduit 72, and the second fuel vapor filtering passage 45. Thus, the expansion pressure in the fuel tank 1 can be released to the first and the second canisters 3, 4.

Figure 11:
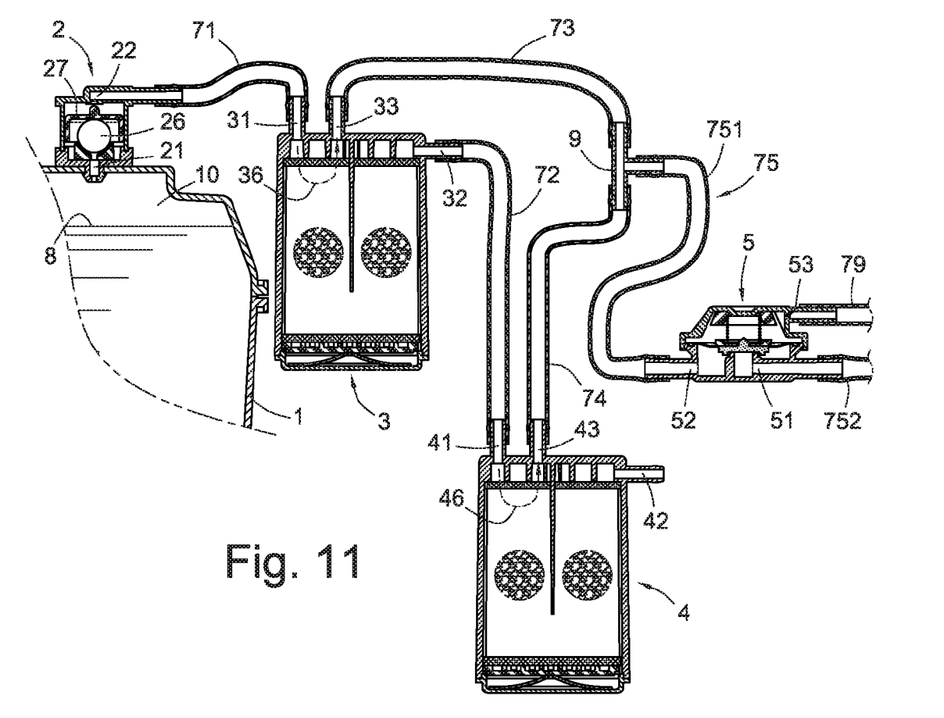
FIG. 11 is a schematic, cross-sectional view of a fuel vapor emission adjusting device according to a third embodiment of the present invention.

Referring to FIG. 11, a fuel vapor emission adjusting device according to a third embodiment of the present invention is shown. The fuel vapor emission adjusting device has a similar structure to that of the second embodiment except that the control valve 5 is disposed between the first fuel vapor recycling passage 36 and the second fuel vapor recycling passage 46. That is, the second vapor vent 52 is connected to a fore port 751 of the fifth conduit 75, the first vapor vent 51 is connected to a rear port 752 of the fifth conduit 75, which the rear port 752 is connected to the engine leading-in vent. The third vapor vent 53 is connected to an engine negative pressure port through a nine conduit 79.

Figure 12:
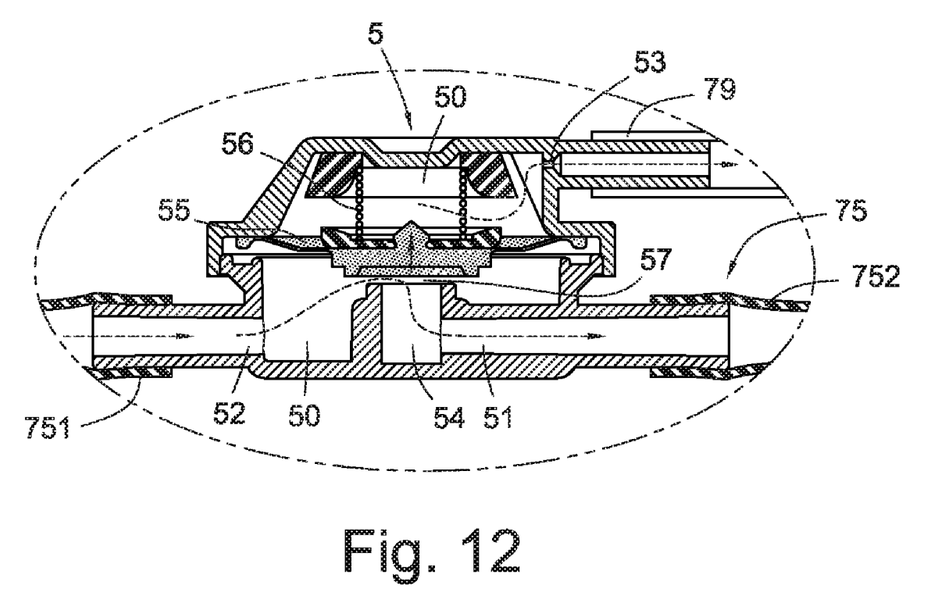
FIG. 12 is a partially enlarged view of the fuel vapor emission adjusting device of FIG. 11.

In operation, when the engine negative pressure port produces a negative pressure, it absorbs the fuel vapor stored between the top portion of the valve chamber 50 and the valve plug 55 through the nine conduit 79 and the third vapor vent 53, and drives the valve plug 55 to move upward and opens the valve port 57 of the control valve 5 (as shown in FIGS. 11 and 12). Thus, the fuel vapor at the fore port 751 of the fifth conduit 75 is guided into the first vapor vent 51 through the second vapor vent 52, the valve chamber 50, the valve port 57, and the channel 54; and then into the engine leading-in vent through the rear port 752 of the fifth conduit 75. When no the engine negative pressure is applied, the valve plug 55 moves downward to close the valve port 57 of the control valve 5 and shuts off the communication of the valve port 57 and the engine leading-in vent. Through the above described configuration, the fuel vapor emission adjusting device can control the time of the fuel vapor recycled by the first and the second recycling passages 36, 46 turning on or turning off the engine leading-in vent.

Figure 13:
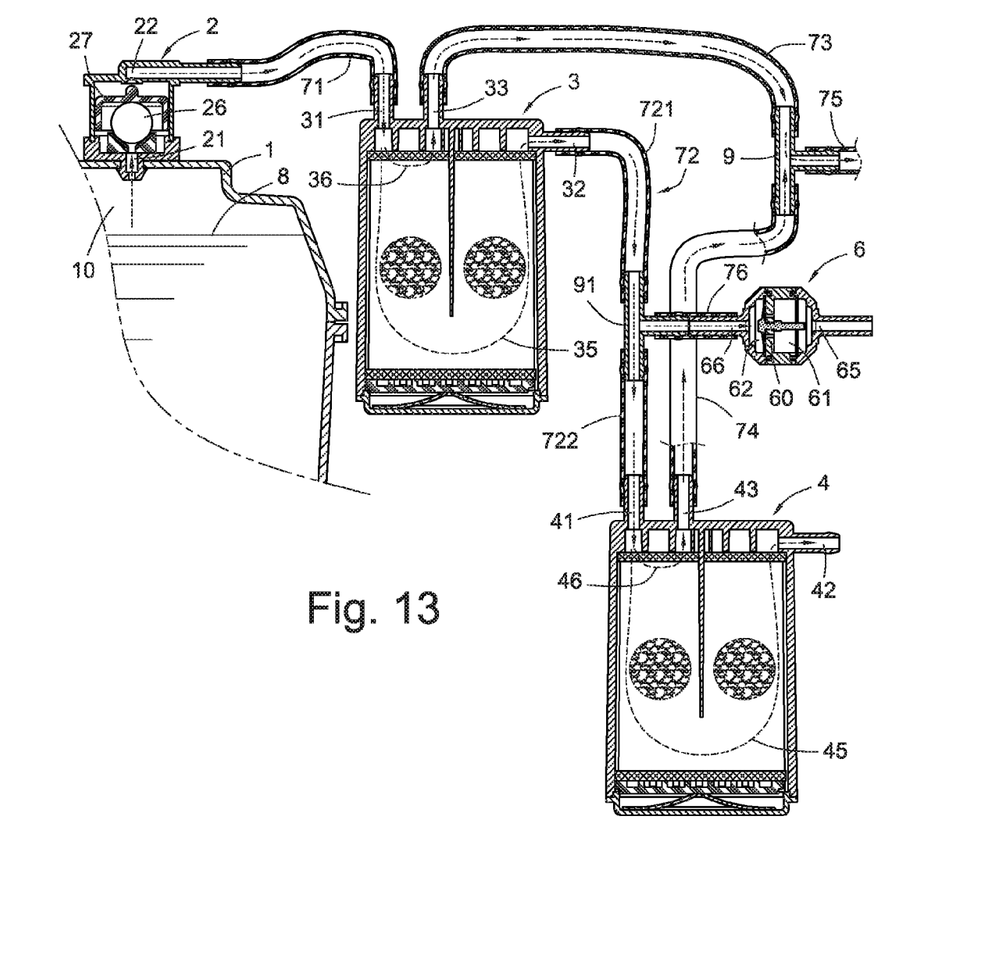
FIG. 13 is a schematic, cross-sectional view of a fuel vapor emission adjusting device according to a fourth embodiment of the present invention.
Figure 14:
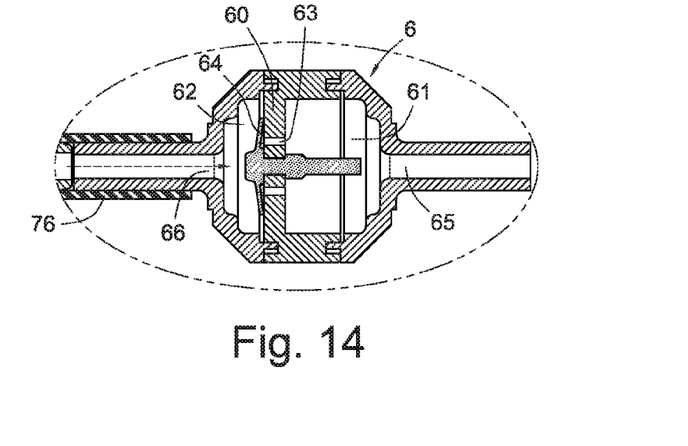
FIG. 14 is a partially enlarged view of the fuel vapor emission adjusting device of FIG. 13.

Referring to FIG. 13, a fuel vapor emission adjusting device according to a fourth embodiment of the present invention is shown. The fuel vapor emission adjusting device has a similar structure to that of the first embodiment except that a one way valve 6 is provided between the first fuel vapor filtering passage 35 and the second fuel vapor filtering passage 45 (as shown in FIG. 13). The one way valve 6 has a first valve chamber 61 and a second valve chamber 62 (as shown in FIG. 14), a clapboard 60 between the first and the second valve chambers 61, 62. The clapboard 60 has a plurality of air holes 63. A film 64 is provided on a surface of the clapboard 60 facing the second valve chamber 62, which can cover the plurality of air holes 63. The first valve chamber 61 connects with an inlet port 65 for communicating with external atmosphere environment, and the second valve chamber 62 connects with an exhausting port 66 communicating with a sixth conduit 76. A second tee pipe 91 is provided to connect with a fore port 721 of the second conduit 72, a rear port 722 of the second conduit 72 and the sixth conduit 76.

Figure 15:
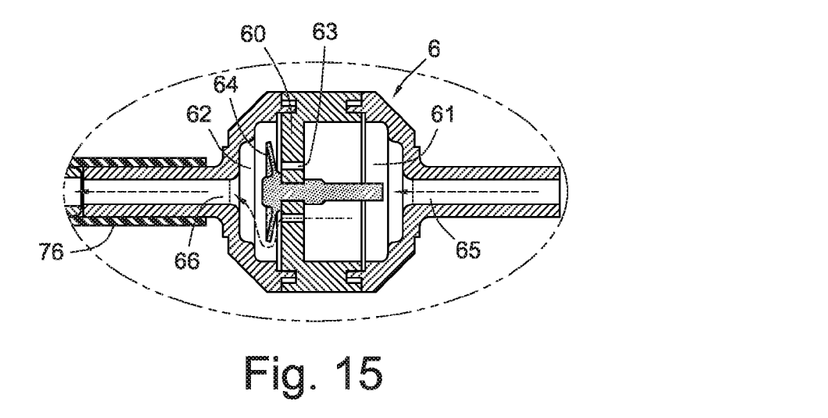
FIG. 15 is a schematic, cross-sectional view showing an operation state of the fuel vapor emission adjusting device of FIG. 14.

In operation, when the fuel vapor in the first fuel vapor filtering passage 35 flows into the second fuel vapor filter passage 45 through the second conduit 72 (as shown in FIG. 13), a part of the fuel vapor under the expansion pressure is driven into the second valve chamber 62 through the sixth conduit 76 and the exhausting port 66 (as shown in FIG. 14), which drives the film 64 to cover the plurality of air holes 63 to close the one way valve 6 and stop the fuel vapor flowing into the atmosphere through the one way valve 6. In addition, when a lot of fuel vapor is cumulated at the trap valves and the activated carbon of the first canister 3, the engine leading-in port provide a negative pressure to the second fuel vapor recycling passage 46 (as shown in FIG. 13) through the fifth and the fourth conduits 75, 74, which produces vacuum pressure at the second conduit 72 between the first and the second fuel vapor filtering passages 35, 45 and the second valve chamber 62 of the one way valve 6 (as shown in FIG. 15). At the same time, external atmosphere enters into the plurality of air holes 63 through the inlet port 65 and the first valve chamber 61, and drives the film 64 to open the plurality of air holes 63, which makes the external atmosphere to be guided into the second conduit 72 along the plurality of air holes 63, the second valve chamber 62, the exhausting port 66 and the sixth conduit 76 for adjusting the vacuum pressure at the second conduit 72. Thus, the atmosphere can be guided between the first and the second fuel vapor filtering passages 35, 45 for removing the vacuum pressure thereat, and make the second fuel vapor recycling passage 46 and the second fuel vapor filtering passage 45 to work normally.

Figure 16:
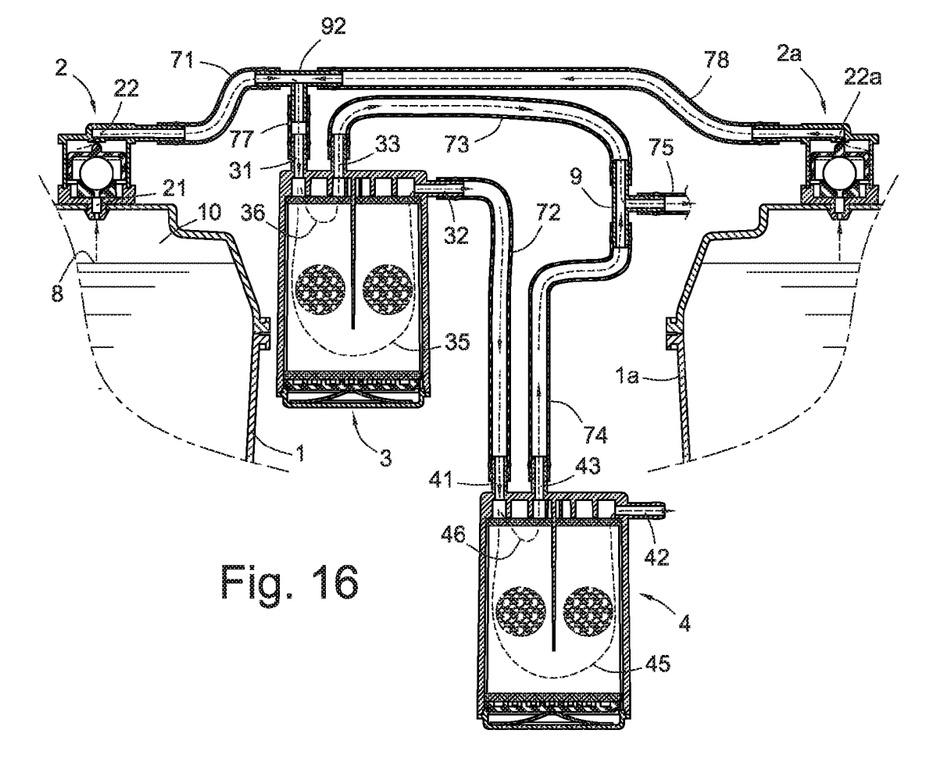
FIG. 16 is a schematic, cross-sectional view of a fuel vapor emission adjusting device according to a fifth embodiment of the present invention.

Referring to FIG. 16, a fuel vapor emission adjusting device according to a sixth embodiment of the present invention is shown. The fuel vapor emission adjusting device has a similar structure to that of the first embodiment except that two fuel tanks 1, 1a are provided. A seventh conduit 77 is provided at the entrance port 31 of the first canister 3, and an eighth conduit 78 is provided at an educing vent 22a of an oil spill trip valve 2a of a second fuel tank 1a. A third tee pipe 92 is further provided to connect the seventh conduit 77, the eighth conduit 78, and the first conduit 71, which makes the two fuel tanks 1, 1a to connect the first canister 3. Thus, the first and the second canisters 3, 4 can simultaneously filter and recycle the fuel vapor from the two fuel tanks 1, 1*a* and supply the atmosphere to the two fuel tanks 1, 1*a*.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A fuel vapor adjusting device comprising:
   an expansion chamber at a top portion of a fuel tank;
   an oil spill trip valve being connected to the expansion chamber, which can turn off when there's spilling oil or the fuel tank is fell down; and
   at least two canisters, each comprising a fuel vapor entrance port, a fuel vapor outlet port, and a fuel vapor recycling vent, the fuel vapor entrance port and the fuel vapor outlet port forming a fuel vapor filtering passage, and the fuel vapor entrance port and the fuel vapor recycling vent forming a fuel vapor recycling passage;
   wherein the oil spill trip valve, the at least two fuel vapor filtering passages connect in series, and the oil spill trip valve, the at least two fuel vapor recycling passages connect in parallel.

2. The fuel vapor adjusting device as claimed in claim 1, further comprising a control valve provided between the oil spill trip valve and the at least two fuel vapor filtering passages.

3. The fuel vapor adjusting device as claimed in claim 1, further comprising a control valve provided between the at least two fuel vapor recycling passage and an engine inlet port, for controlling the time of turning on or turning off the engine inlet port.

4. The fuel vapor adjusting device as claimed in claim 1, further comprising a one way valve between the at least two fuel vapor filtering passages, which connects with external atmosphere environment.

\* \* \* \* \*